(12) United States Patent
Veca et al.

(10) Patent No.: US 10,591,273 B2
(45) Date of Patent: Mar. 17, 2020

(54) DEFORMATION DETECTING DEVICE COMPRISING A MULTI-FUNCTIONAL FABRIC WITH FLOCKED CONDUCTIVE WEFT YARNS

(71) Applicant: C.R.F. Società Consortile per Azioni, Orbassano (Turin) (IT)

(72) Inventors: Antonino Domenico Veca, Orbassano (IT); Bartolomeo Placenza, Orbassano (IT); Vito Guido Lambertini, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 0 days.

(21) Appl. No.: 16/134,416

(22) Filed: Sep. 18, 2018

(65) Prior Publication Data

US 2019/0120607 A1    Apr. 25, 2019

(30) Foreign Application Priority Data

Oct. 20, 2017    (EP) .................................... 17197599

(51) Int. Cl.
*G01B 7/16* (2006.01)
*D02G 3/44* (2006.01)
(Continued)

(52) U.S. Cl.
CPC ................ *G01B 7/22* (2013.01); *B60K 37/06* (2013.01); *B60N 2/002* (2013.01); *B60N 2/0228* (2013.01);
(Continued)

(58) Field of Classification Search
CPC ...... B60N 2/797; D02G 3/441; D03D 1/0088; D03D 2700/0166; G01L 1/146
See application file for complete search history.

(56) References Cited

U.S. PATENT DOCUMENTS 4,659,873 A * 4/1987 Gibson .................. H01H 3/141
                                                    178/18.05
4,795,998 A * 1/1989 Dunbar .................. G01L 1/205
                                                    338/208
(Continued)

FOREIGN PATENT DOCUMENTS

DE        19927686 A1    3/2001
EP         1927825 A1    6/2008
(Continued)

OTHER PUBLICATIONS

Search Report for European Application No. 17197599.8 completed on Feb. 14, 2018.

*Primary Examiner* — Kyung S Lee
(74) *Attorney, Agent, or Firm* — Heslin Rothenberg Farley & Mesiti P.C.; Victor A. Cardona, Esq.

(57) ABSTRACT

A deformation detecting device includes weft yarns and warp yarns woven together. At least some of the weft yarns, or some weft yarns, and some warp yarns, are electrically conductive. The weft yarns include a flocking made up of non-electrically conductive fibers protruding substantially radially from the weft yarns. The electrically conductive yarns are connected to conductive ends for applying an electrical voltage, such that yarns that are connected to conductive ends with different polarities define respective plates of a capacitive sensor, while the fibers of the flocking of the weft yarns define a dielectric material interposed between the capacitive sensor plates. The device comprises an electronic control and processing unit configured to detect a deformation of the fabric based on a capacitance variation of the capacitive sensor.

11 Claims, 5 Drawing Sheets

(51) Int. Cl.
  *G01L 1/14* (2006.01)
  *D03D 1/00* (2006.01)
  *B60N 2/00* (2006.01)
  *B60K 37/06* (2006.01)
  *B60N 2/58* (2006.01)
  *B60N 2/75* (2018.01)
  *B60N 2/02* (2006.01)

(52) U.S. Cl.
  CPC ............... *B60N 2/58* (2013.01); *B60N 2/797* (2018.02); *D02G 3/441* (2013.01); *D03D 1/0088* (2013.01); *G01L 1/146* (2013.01); *D03D 2700/0166* (2013.01); *D10B 2101/122* (2013.01); *D10B 2331/02* (2013.01); *D10B 2331/04* (2013.01); *D10B 2505/08* (2013.01)

(56) References Cited

U.S. PATENT DOCUMENTS

| | | | |
|---|---|---|---|
| 6,277,771 B1 * | 8/2001 | Nishimura | B29C 70/22 442/229 |
| 7,750,790 B2 | 7/2010 | Yang et al. | |
| 8,089,336 B2 * | 1/2012 | Burkitt | G06F 3/0202 338/101 |
| 9,645,021 B2 * | 5/2017 | Miura | G01L 1/22 |
| 9,816,799 B2 * | 11/2017 | Keller | G01B 7/18 |
| 10,067,007 B2 * | 9/2018 | Keller | G01L 1/142 |
| 2006/0255903 A1 * | 11/2006 | Lussey | H01H 3/141 338/47 |
| 2007/0171024 A1 | 7/2007 | Yang et al. | |
| 2007/0248799 A1 * | 10/2007 | DeAngelis | G01L 1/146 428/209 |
| 2008/0000304 A1 | 1/2008 | Nagle et al. | |
| 2011/0018556 A1 * | 1/2011 | Le | H03K 17/955 324/654 |

FOREIGN PATENT DOCUMENTS

| | | |
|---|---|---|
| GB | 2443208 A | 4/2008 |
| WO | 2014001843 A1 | 1/2014 |
| WO | 2016198969 A1 | 12/2016 |

* cited by examiner

DEFORMATION DETECTING DEVICE COMPRISING A MULTI-FUNCTIONAL FABRIC WITH FLOCKED CONDUCTIVE WEFT YARNS

CROSS REFERENCE TO RELATED APPLICATIONS

This application claims priority from European Patent Application No. 17197599.8 filed on Oct. 20, 2017, the entire disclosure of which is incorporated herein by reference.

FIELD OF THE INVENTION

The present invention relates to deformation detecting devices, and in particular to capacitive deformation detecting devices.

STATE OF THE PRIOR ART

In the prior art, multi-functional fabrics have already been proposed that include capacitive deformation sensors (see, for example, EP 1 927 825 A1, WO 2014001843 A1, WO 2016198969 A1, US 2008000304 A1).

However, none of the known solutions makes it possible to produce a deformation detecting device that is fully satisfactory, both in terms of manufacturing simplicity, and in terms of reliability and precision of operation.

OBJECT OF THE INVENTION

The object of the present invention is that of producing a deformation detecting device integrated in a multi-functional fabric that is relatively simple to construct and, at the same time, has a high sensitivity and precision during operation.

SUMMARY OF THE INVENTION

In view of achieving this object, the invention relates to a deformation detecting device, comprising:
  a multi-functional fabric, including weft yarns and warp yarns woven together,
  wherein at least some of said weft yarns, or at least some of said weft yarns and at least some of said warp yarns, are electrically conductive,
  wherein said weft yarns are provided with a flocking made up of non-electrically conductive fibers protruding substantially radially from the weft yarns,
  wherein the electrically conductive yarns are connected to conductive ends for applying an electrical voltage, in such a way that yarns connected to conductive ends of different polarities define respective plates of a capacitive sensor, while the fibers of the flocking of said weft yarns define a dielectric material interposed between the capacitive sensor plates,
  said device comprising an electronic control and processing unit connected to said conductive ends and configured to detect a deformation of said fabric on the basis of a detection of a capacitance variation of said capacitive sensor.

In a first embodiment, only the weft yarns are electrically conductive and are connected to conductive ends for applying an electrical voltage, in such a way that weft yarns that are connected to conductive ends having different polarities define the plates of the capacitive sensor, while the fibers of the flocking of said weft yarns define a dielectric material interposed between the capacitive sensor plates, In a second embodiment, both at least some of said weft yarns, and at least some of said warp yarns are electrically conductive. In this case, the electrically conductive weft yarns and the electrically conductive warp yarns are, respectively, connected to conductive ends having different polarities, to define the capacitive sensor plates, while the flocking fibers of said weft yarns define a dielectric material interposed between the capacitive sensor plates.

Methods for flocking threads or yarns are well-known and have been used since long. According to this method, flocking fibers of various materials (e.g. polyamides or polyesters) are applied to a multifilament or monofilament core, for example, of polyamide or polyester or rayon, coated with acrylic adhesive. During application, the fibers are radially oriented with respect to the core by means of an electrostatic field. The result is a flocked yarn with a velvety appearance and soft touch due to the high amount of air (even up to 80%) retained inside the yarn.

Studies and investigations carried out by the Applicant have surprisingly shown that the use of a multi-functional fabric having flocked weft yarns enables the production of a capacitive deformation detecting device that is particularly efficient, reliable, and sensitive and precise during operation. This is due to the nature of the flocked yarn that allows, when subjected to a deforming force, a high degree of deformation of the flocking fibers, resulting in an increased capacity to detect a deformation in a readily, reliable and precise manner.

The weft yarns are monofilament or multifilament cores of non-conductive polymeric material supplemented with electrically conductive fibers, and the flocking of the weft yarns is made up of fibers of non-conductive polymeric material, such as polyamide or PET. In the case of the first embodiment defined above, the warp yarns are made of non-conductive polymeric material and are devoid of flocking. In the case of the second embodiment mentioned above, the warp yarns are preferably made of non-conductive polymeric material supplemented with electrically conductive fibers and are, however, devoid of flocking.

The electronic control unit can be configured to generate a deformation signal only when the detected deformation exceeds a predetermined threshold.

The invention also relates to advantageous applications of the device according to the invention. In particular, the invention also relates to a motor-vehicle seat, comprising a cushion and a backrest and a sensor associated with the cushion to signal the presence of an occupant, characterized in that said sensor is formed of a device according to the invention, integrated into a seat lining fabric. According to a further aspect, the invention also relates to a motor-vehicle passenger compartment element, for example, a dashboard or armrest, carrying a push-button pressure sensor for activating devices or on-board services of the motor-vehicle, characterized in that said pressure sensor is formed of a device according to the invention, which is integrated into a lining fabric of the passenger compartment element.

DETAILED DESCRIPTION OF THE DRAWINGS

Further characteristics and advantages of the invention will become apparent from the description that follows with reference to the attached drawings, provided purely by way of non-limiting example, wherein.

Figure 3:
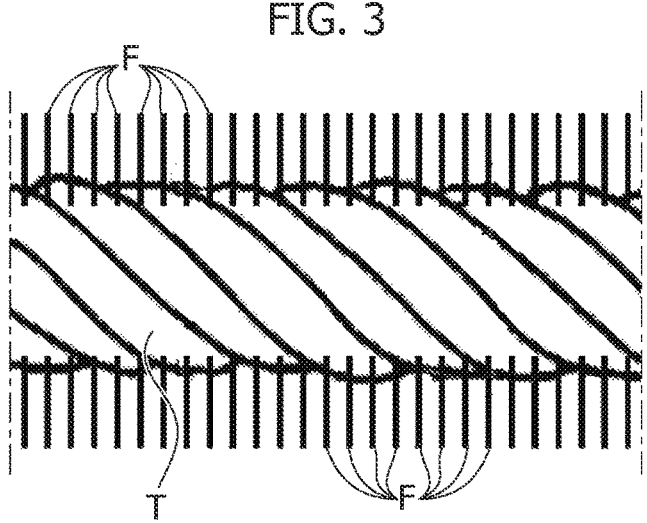
Figure 4:
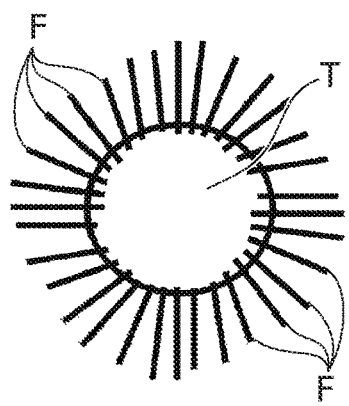
Figure 5:
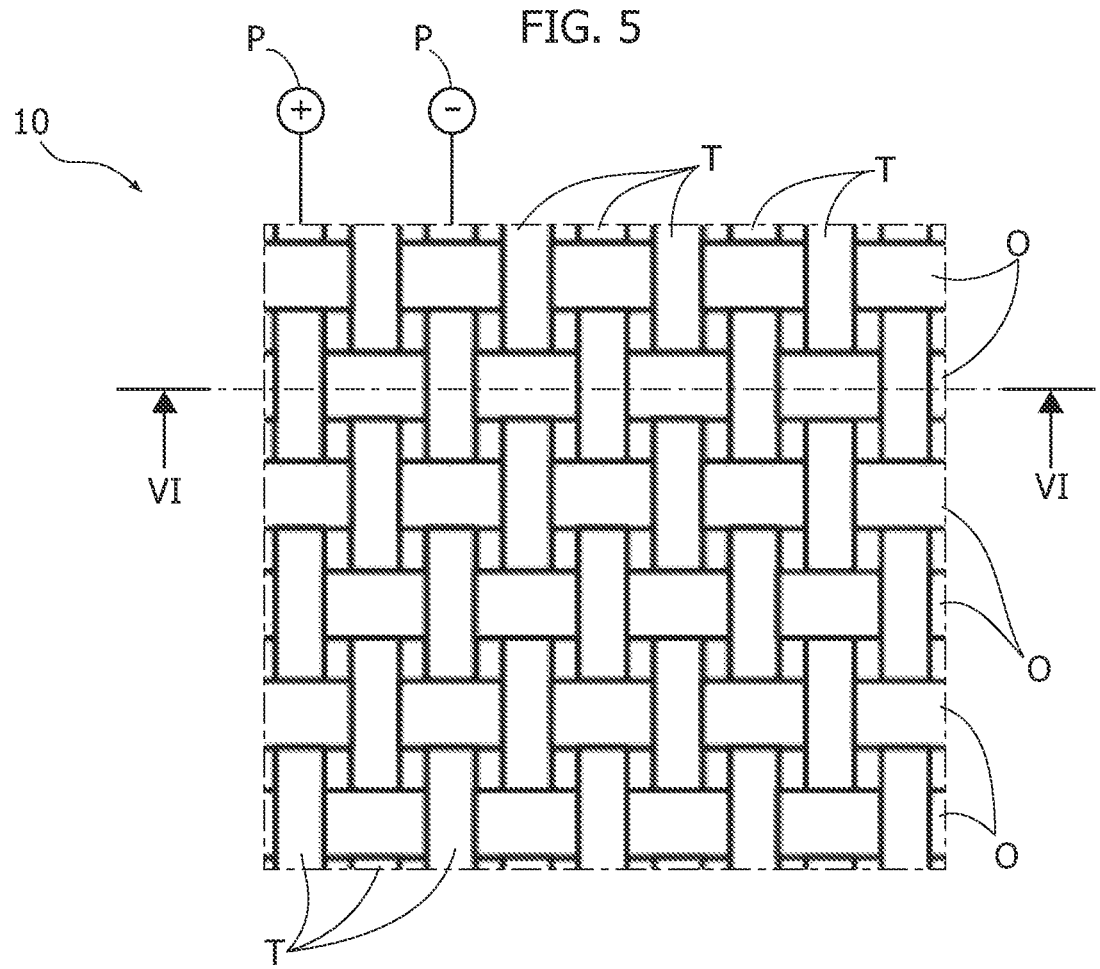
Figure 6:
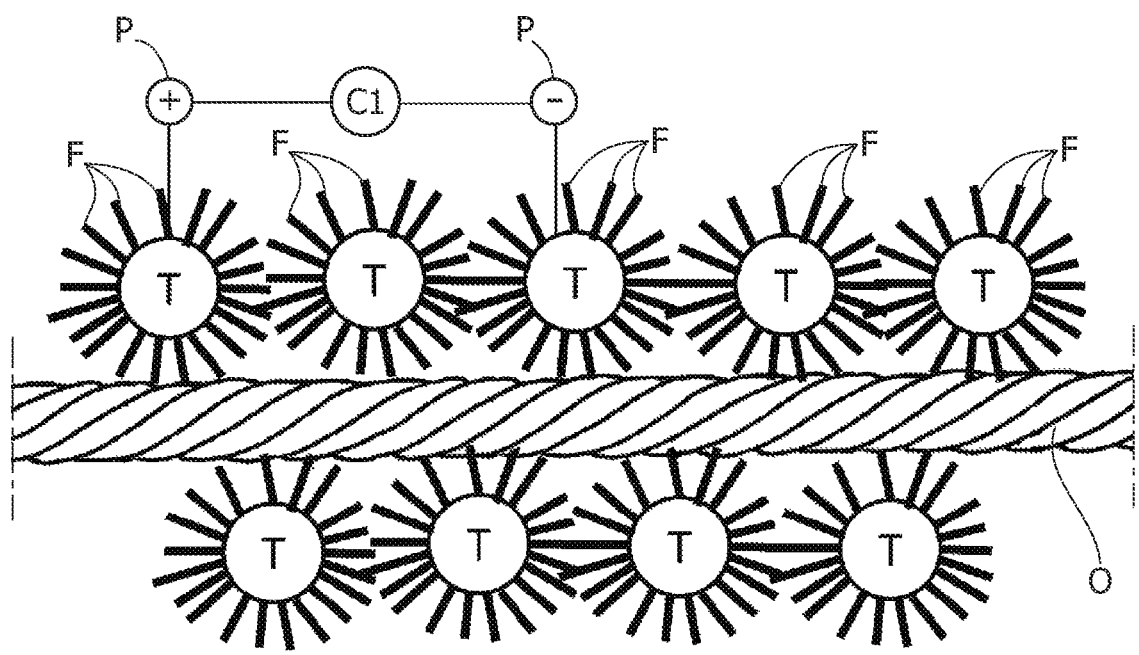
Figure 7:
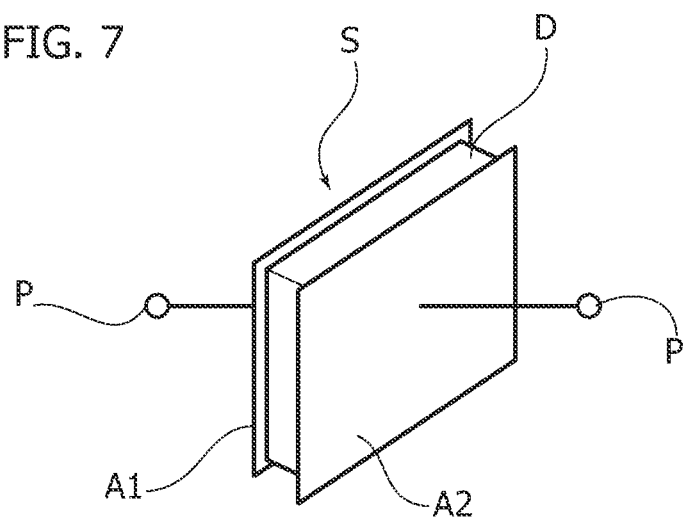
Figure 8:
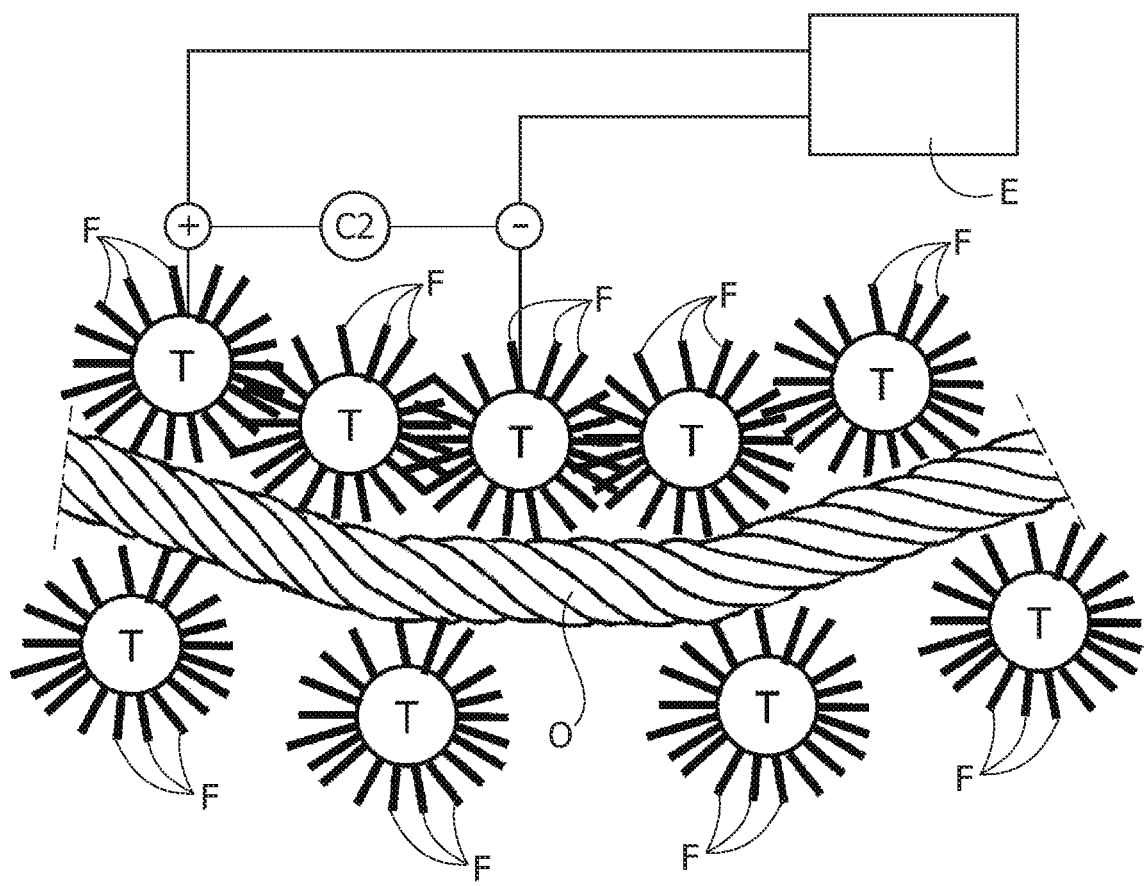
Figure 9:
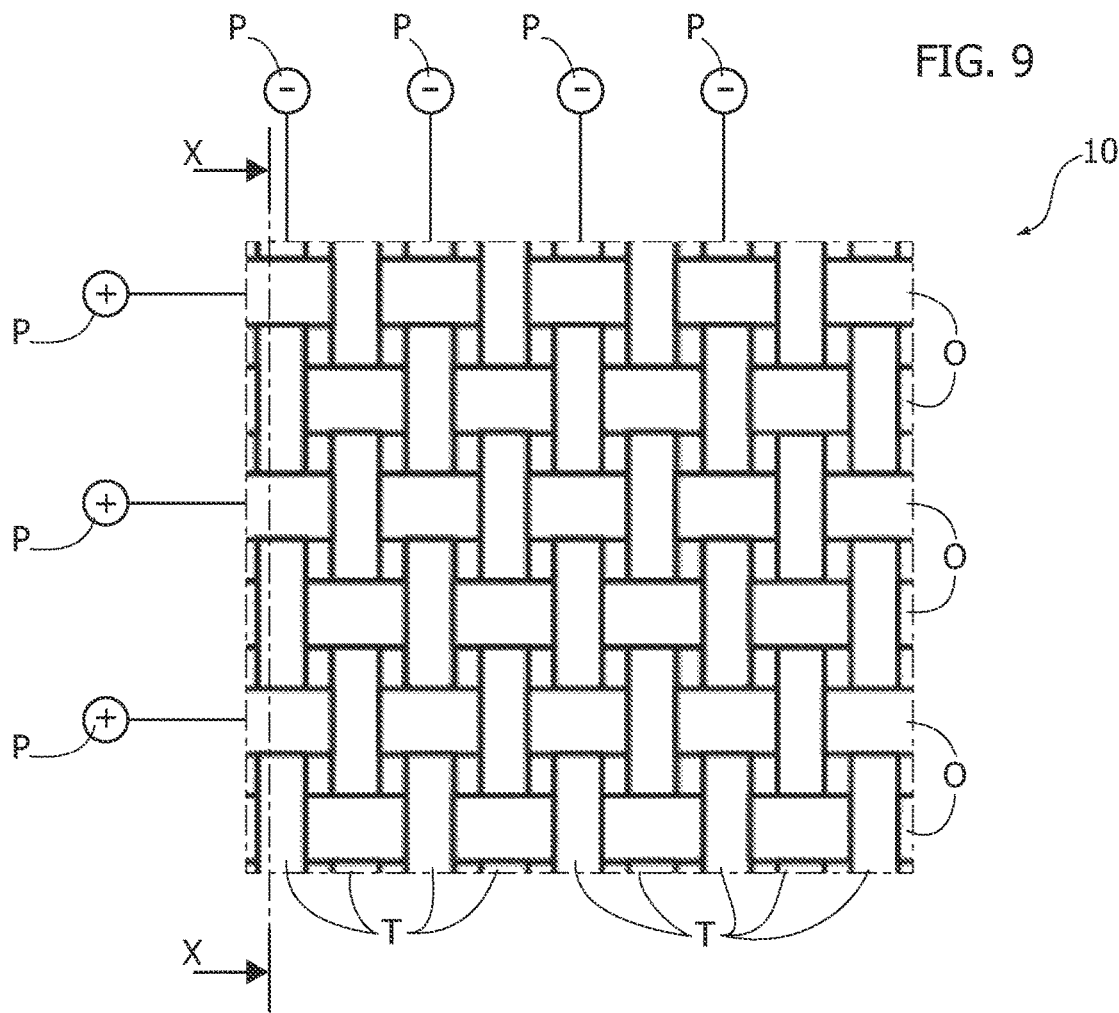
Figure 10:
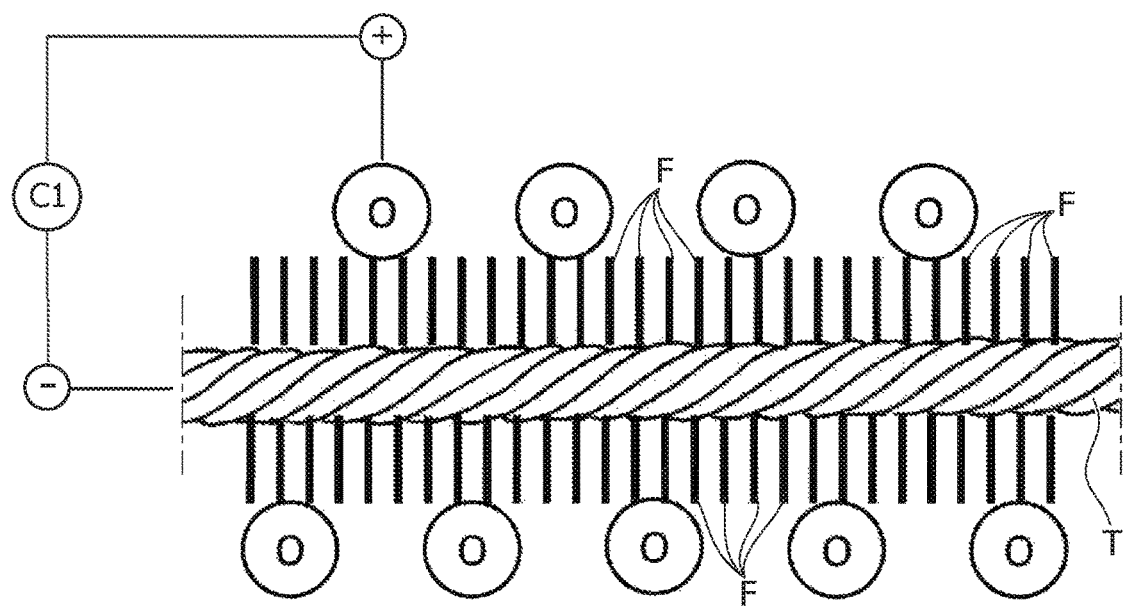
Figure 11:
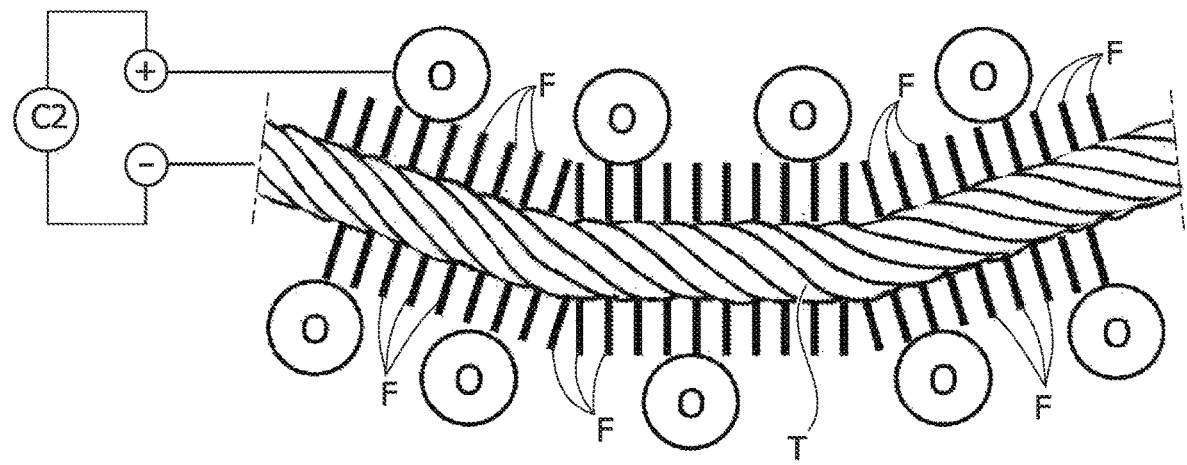
Figure 12:
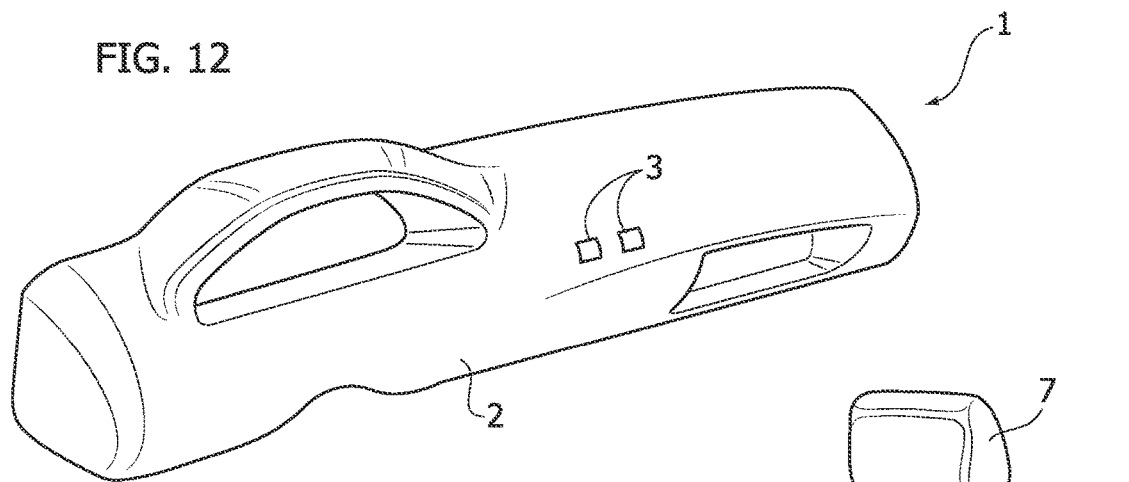
Figure 13:
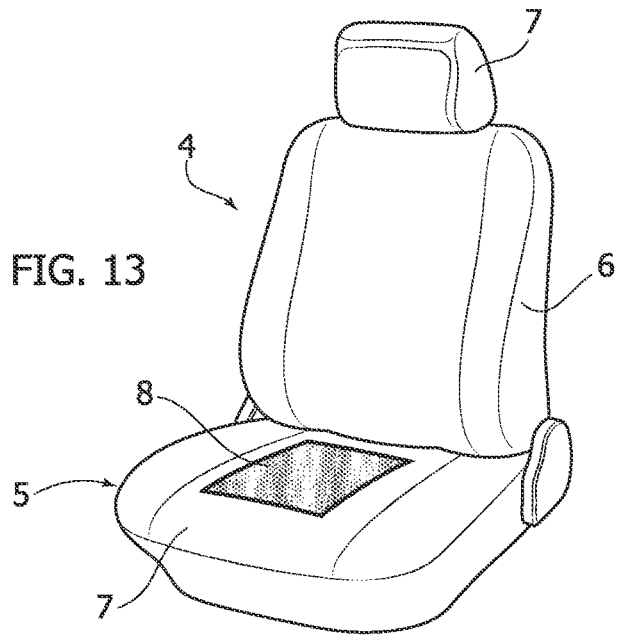

FIGS. 3 and 4 are a schematic side view and a cross-sectional view, respectively, of a flocked yarn, FIG. 5 is view of a portion of fabric produced in accordance with a first embodiment of the present invention, FIG. 6 is a cross-sectional schematic view along the line VI-VI of FIG. 5, FIG. 7 is a schematic perspective view of an electric capacitor, FIG. 8 is a schematic view corresponding to that of FIG. 6, which illustrates a portion of the fabric in a deformed condition, FIG. 9 is a view corresponding to that of FIG. 5, which illustrates a second embodiment of the present invention, FIG. 10 is a cross-sectional schematic view along the line X-X of FIG. 9, FIG. 11 illustrates a view corresponding to that of FIG. 10 in a deformed condition of the fabric, and FIGS. 12 and 13 are schematic perspective views of a motor-vehicle dashboard and a motor-vehicle seat incorporating the present invention.

Figure 1:
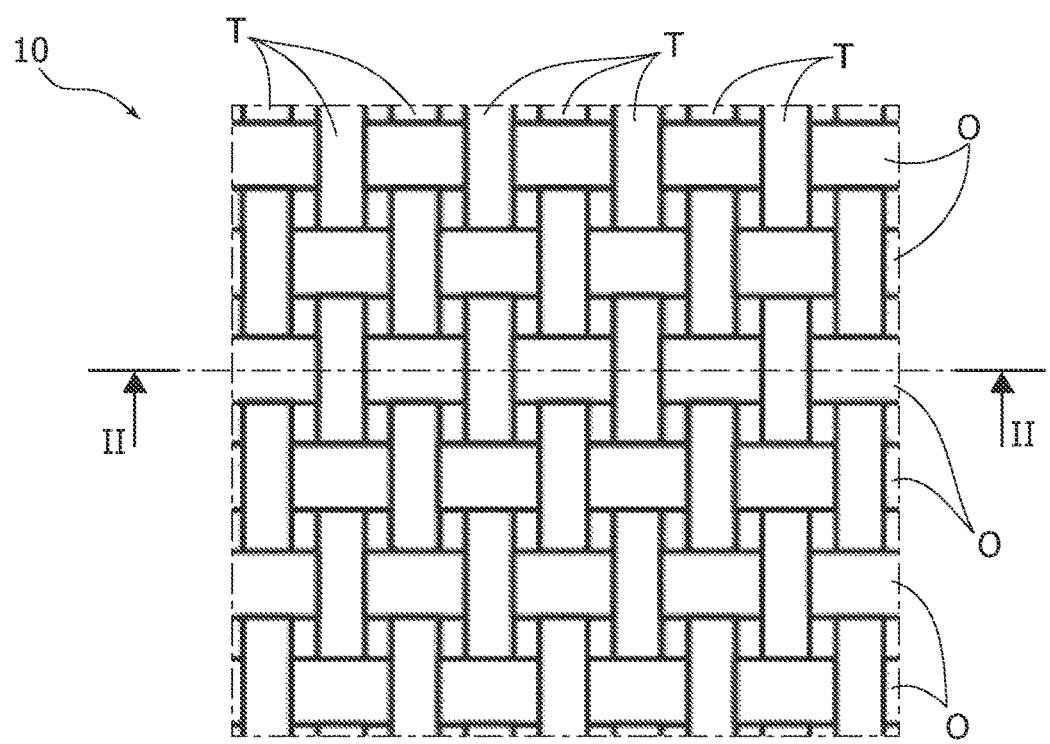
FIG. 1 is a schematic view of a portion of fabric.
Figure 2:
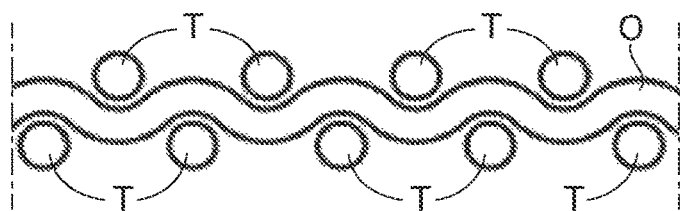
FIG. 2 is a schematic cross-sectional view according to the line II-II.

FIG. 1 schematically illustrates a portion of fabric with weft yarns T woven with warp yarns O. The illustrated diagram is provided herein purely by way of example, being possible to use any other alternative pattern for weaving the fabric.

According to a fundamental characteristic of the present invention, the fabric used to produce the device of the invention is a fabric in which at least some of the weft yarns T are flocked yarns (see FIGS. 3, 4), i.e., provided with a flocking made of fibers or microfibers F protruding substantially radially from each weft yarn T.

In the present description, the detail of the method used to produce the flocked weft yarns T is not explained, since the flocking method can be produced in any known manner and using devices of any known type.

Another essential characteristic of the present invention lies in the fact that the weft yarns T, or at least part of the weft yarns T of the fabric are electrically conductive. This means that each weft yarn is electrically conductive, while the fibers F of the flocking are not electrically conductive. Preferably, each weft yarn T is formed of a polymeric material (e.g., polyester) made conductive by the addition of active fibers, for example, carbon nanotubes (CNTs), or graphene, or metals in general. Non-conductive fibers of the flocking are preferably made of polyamide or PET.

FIGS. 5, 6 and 8 relate to a first embodiment, in which only the flocked weft yarns T are electrically conductive, while the non-flocked warp yarns O are non-electrically conductive. For example, warp yarns can be made of polymeric material such as polyester.

In the embodiment of FIGS. 5, 6 and 8, electrically conductive flocked weft yarns are connected to conductive ends P, schematically illustrated in the figures, for applying an electrical voltage, in such a way that the weft yarns T that are connected to the conductive ends P having different polarities define respective plates of a capacitive sensor, while the fibers F of the flocking of the weft yarns T define a dielectric material interposed between the capacitive sensor plates.

FIG. 7 of the attached drawings schematically illustrates an electric capacitor, comprising two electrically conductive plates A1, A2 connected to conductive ends P and between which a dielectric material D is interposed. Referring to FIG. 5 and FIG. 7, the weft yarns T electrically connected to the positive poles and to the negative poles of the conductive ends P constitute the plates A1, A2 of the capacitance sensor schematically illustrated in FIG. 7, while the fibers F of the weft yarns T constitute the dielectric material D of the capacitive sensor schematized in FIG. 7. Of course, several weft yarns T can be connected in parallel to each other, to the positive pole and to the negative pole of the electric power supply system.

With reference to the exemplary, enlarged scale diagrams of FIGS. 6 and 8, two electrically conductive weft yarns T connected to conductive ends P of opposite polarities, together with the dielectric material formed of the fibers F interposed with each other, constitute an electrical capacitor having a capacitance C1, which is dependent on the distance between the capacitor plates, that is, the distance between the weft yarns T connected electrically to the positive and negative poles P.

In the case of a deformation of the fabric, for example, of the type illustrated in FIG. 8, the distance between the two electrically conductive weft yarns electrically connected to the opposite ends of the electrical power supply system is reduced, so that the capacitance of the equivalent capacitor assumes a value C2, different from that of the capacitance of the undeformed capacitor. The different pairs of electrically conductive weft yarns T are connected in any way to an electronic control unit E configured to receive the signal emitted by the capacitive sensor integrated within the fabric, and to process the signal in order to generate a signal indicative of the detected deformation.

The device can be configured either simply to generate an on/off signal, in the case, for example, when used as a switch to activate or deactivate any type of electrical device controlled by it, or to generate a signal indicative of the degree of detected deformation.

The advantage of using flocked weft yarns to produce the capacitive sensor integrated in the fabric is related to the very nature of the flocking fibers, which are capable of undergoing high deformations and consequently of facilitating the transmission of a deformation signal precisely and reliably.

The electronic control unit E can also be configured to generate a deformation signal only above a predetermined minimum threshold value of the detected deformation value.

FIGS. 9-11 relate to a second embodiment that differs from the first embodiment described above by the fact that, in this case, both the weft yarns T, and the warp yarns O are electrically conductive. The weft yarns T and the warp yarns O can be, for example, formed by polymers made conductive by the addition of active fibers, for example, carbon nanotubes (CNTs), or graphene or metals in general. Like the first embodiment, only the weft yarns T are flocked. The weft yarns T are electrically conductive, but they have flocking fibers F that are not electrically conductive. In this second embodiment, both the electrically conductive weft yarns T, and the electrically conductive warp yarns O are connected to conductive ends P for the application of an electrical voltage. In the illustrated example, all the weft yarns T, or at least some of them, are connected to a polarity, while all the warp yarns O, or at least some of them, are connected to the other polarity. In this way, the weft yarns and the warp yarns define the plates A1, A2 of the equivalent capacitive sensor shown in FIG. 7. The dielectric material D of the equivalent capacitive sensor illustrated in FIG. 7 is constituted, in this embodiment as well, by the fibers F of the flocking of the weft yarns T.

As shown in FIGS. 10 and 11, also in this case, a deformation of the fabric leads to a variation in the distance between the plates of the equivalent capacitive sensor, with a consequent variation (from C1 to C2) of the capacitance value of the sensor. Again, the conductive ends of the weft yarns T and the warp yarns O are connected to the electronic control unit E, which is configured as already specified with reference to the first embodiment.

The device according to the invention is of general application. However, according to further aspects of the present invention, specific applications of particular interest in the automotive field are provided.

FIG. 12 refers to a further aspect of the present invention, according to which a motor-vehicle passenger compartment element is produced, for example, in the form of a dashboard or armrest, incorporating one or more pressure sensors acting as pushbuttons for activating devices or on-board services of the motor-vehicle. FIG. 12 illustrates, by way of example, the case of a dashboard 1 having a body lined at least partially with a fabric 2 produced in accordance with the present invention, and including areas 3 acting as pressure sensors integrated into the fabric of the lining.

According to a further aspect, the invention also relates to a motor-vehicle seat. FIG. 13 illustrates, as an example, a seat 4, including a cushion 5 and a backrest 6 provided with a headrest 7. The cushion 5 includes a lining fabric 7 at least partially produced according to the disclosures of the present invention, and including an area 8 in the central part of the upper surface of the cushion 5, which acts as a capacitive deformation sensor to signal the presence of an occupant of the seat. According to the conventional art, the occupant presence sensor can be used, for example, to enable or disable one or more airbags arranged in the motor-vehicle in association, for example, with a passenger seat.

Naturally, without prejudice to the principle of the invention, the details of construction and the embodiments may vary widely with respect to those described and illustrated purely by way of example, without departing from the scope of the present invention.

In particular, in all the embodiments illustrated, the configurations and functions of the weft yarns and the warp yarns, as described above and as indicated in the attached claims, can be exchanged with each other.

The invention claimed is:

1. A deformation detecting device, comprising:
   a multi-functional fabric, including weft yarns and warp yarns woven together,
   wherein at least some of said weft yarns, or both at least some of said weft yarns and at least some of said warp yarns, are electrically conductive,
   wherein said weft yarns are provided with a flocking made up of non-electrically conductive fibers protruding substantially radially from the weft yarns,
   wherein the electrically conductive yarns are connected to conductive ends for applying an electrical voltage, in such a way that yarns connected to conductive ends of different polarities define respective capacitive sensor plates of a capacitive sensor, while the fibers of the flocking of said weft yarns define a dielectric material interposed between the capacitive sensor plates, and
   an electronic control and processing unit connected to said conductive ends and configured to detect a deformation of said fabric on the basis of a detection of a capacitance variation of said capacitive sensor.

2. A deformation detecting device according to claim 1, wherein only the weft yarns are electrically conductive,
   wherein the electrically conductive weft yarns are connected to the conductive ends for applying an electrical voltage, in such a way that the weft yarns that are connected to the conductive ends having different polarities define plates of the capacitive sensor, while the fibers of the flocking of said weft yarns define a dielectric material interposed between the capacitive sensor plates.

3. A deformation detecting device according to claim 1, wherein at least some of said weft yarns, and at least some of said warp yarns, are electrically conductive,
   wherein the electrically conductive weft yarns and the electrically conductive warp yarns are connected, respectively, to the conductive ends having different polarities, to define the plates of the capacitive sensor, while the fibers of the flocking of said weft yarns define a dielectric material interposed between the capacitive sensor plates.

4. A device according to claim 1, wherein the weft yarns are yarns or strands of non-conductive polymeric material supplemented with electrically conductive fibers, selected from metal fibers, graphene fibers and carbon nanotubes, and the flocking of the weft yarns is made of fibers of non-conductive polymeric material, such as polyamide or PET.

5. A device according to claim 2, wherein the warp yarns are of non-conductive polymeric material and are devoid of flocking.

6. A device according to claim 3, wherein the warp yarns are formed of non-conductive polymeric material supplemented with electrically conductive fibers selected from fibers of metal, graphene or carbon nanotubes, said warp yarns being devoid of flocking.

7. A device according to claim 1, wherein said electronic unit is configured to generate a deformation signal only above a predetermined threshold of the capacitance variation.

8. A motor-vehicle seat comprising a cushion and a backrest and a sensor associated with the cushion to signal the presence of an occupant, wherein said sensor is formed of a device according to claim 1, integrated into a seat lining fabric.

9. A motor-vehicle passenger compartment element carrying a push-button pressure sensor for activating devices or on-board services of the motor-vehicle, said pressure sensor formed of a device according to claim 1, integrated into a lining fabric of the passenger compartment element.

10. A motor-vehicle passenger compartment dashboard carrying a push-button pressure sensor for activating devices or on-board services of the motor-vehicle, said pressure sensor formed of a device according to claim 1, integrated into a lining fabric of the passenger compartment element.

11. A motor-vehicle passenger compartment armrest carrying a push-button pressure sensor for activating devices or on-board services of the motor-vehicle, said pressure sensor formed of a device according to claim 1, integrated into a lining fabric of the passenger compartment element.

* * * * *